(12) United States Patent
Schechter et al.

(10) Patent No.: US 9,576,028 B2
(45) Date of Patent: *Feb. 21, 2017

(54) MANAGING DATA QUERIES

(71) Applicant: Ab Initio Technology LLC, Lexington, MA (US)

(72) Inventors: Ian Schechter, Sharon, MA (US); Glenn John Allin, Arlington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/628,643

(22) Filed: Feb. 23, 2015

(65) Prior Publication Data

US 2015/0169687 A1 Jun. 18, 2015

Related U.S. Application Data

(63) Continuation of application No. 13/098,823, filed on May 2, 2011, now Pat. No. 9,116,955.

(51) Int. Cl.
*G06F 17/30* (2006.01)

(52) U.S. Cl.
CPC ... *G06F 17/30463* (2013.01); *G06F 17/30398* (2013.01); *G06F 17/30436* (2013.01); *G06F 17/30958* (2013.01)

(58) Field of Classification Search
CPC ............... G06F 17/30463; G06F 17/30442; G06F 17/30
USPC ........................................................ 707/718
See application file for complete search history.

(56) References Cited

U.S. PATENT DOCUMENTS

| 5,088,034 | A | 2/1992 | Ihara et al. |
| 5,151,991 | A | 9/1992 | Iwasawa et al. |
| 5,313,584 | A | 5/1994 | Tickner et al. |
| 5,347,639 | A | 9/1994 | Rechtschaffen et al. |
| 5,367,619 | A | 11/1994 | Dipaolo et al. |
| 5,446,915 | A | 8/1995 | Pierce |

(Continued)

FOREIGN PATENT DOCUMENTS

| CA | 2259362 | 1/1998 |
| CN | 1786950 | 6/2006 |

(Continued)

OTHER PUBLICATIONS

U.S. Appl. No. 12/688,316, filed Jan. 15, 2010, Managing Data Queries.

(Continued)

*Primary Examiner* — Sheree Brown
(74) *Attorney, Agent, or Firm* — Fish & Richardson P.C.

(57) ABSTRACT

In one aspect, in general, a method of generating a dataflow graph representing a database query includes receiving a query plan from a plan generator, the query plan representing operations for executing a database query on at least one input representing a source of data, producing a dataflow graph from the query plan, wherein the dataflow graph includes at least one node that represents at least one operation represented by the query plan, and includes at least one link that represents at least one dataflow associated with the query plan, and altering one or more components of the dataflow graph based on at least one characteristic of the at least one input representing the source of data.

38 Claims, 12 Drawing Sheets

(56) References Cited

U.S. PATENT DOCUMENTS

| | | | |
|---|---|---|---|
| 5,475,842 A | 12/1995 | Gilbert et al. | |
| 5,475,843 A | 12/1995 | Halviatti et al. | |
| 5,546,576 A | 8/1996 | Cochrane et al. | |
| 5,574,898 A | 11/1996 | Leblang et al. | |
| 5,588,150 A | 12/1996 | Lin et al. | |
| 5,600,833 A | 2/1997 | Senn et al. | |
| 5,619,692 A | 4/1997 | Malkemus et al. | |
| 5,632,022 A | 5/1997 | Warren et al. | |
| 5,682,537 A | 10/1997 | Davies et al. | |
| 5,706,509 A | 1/1998 | Man-Hak Tso | |
| 5,712,971 A | 1/1998 | Stanfill et al. | |
| 5,734,886 A | 3/1998 | Grosse et al. | |
| 5,752,196 A | 5/1998 | Ahvenainen et al. | |
| 5,768,564 A | 6/1998 | Andrews et al. | |
| 5,799,149 A | 8/1998 | Brenner et al. | |
| 5,819,021 A | 10/1998 | Stanfill et al. | |
| 5,870,743 A | 2/1999 | Cohen et al. | |
| 5,901,353 A | 5/1999 | Pentikainen | |
| 5,909,681 A | 6/1999 | Passera et al. | |
| 5,930,723 A | 7/1999 | Heiskari et al. | |
| 5,935,216 A | 8/1999 | Benner et al. | |
| 5,956,704 A | 9/1999 | Gautam et al. | |
| 5,966,072 A | 10/1999 | Stanfill et al. | |
| 5,999,729 A | 12/1999 | Tabloski, Jr. et al. | |
| 6,031,993 A | 2/2000 | Andrews et al. | |
| 6,077,313 A | 6/2000 | Ruf | |
| 6,205,465 B1 | 3/2001 | Schoening et al. | |
| 6,253,371 B1 | 6/2001 | Iwasawa et al. | |
| 6,266,804 B1 | 7/2001 | Isman | |
| 6,295,518 B1 | 9/2001 | McLain et al. | |
| 6,311,265 B1 | 10/2001 | Beckerle et al. | |
| 6,330,008 B1 | 12/2001 | Razdow et al. | |
| 6,345,267 B1* | 2/2002 | Lohman | G06F 17/30463 |
| 6,415,286 B1 | 7/2002 | Passera et al. | |
| 6,615,203 B1 | 9/2003 | Lin et al. | |
| 6,625,593 B1 | 9/2003 | Leung et al. | |
| 6,694,306 B1 | 2/2004 | Nishizawa et al. | |
| 6,785,668 B1 | 8/2004 | Polo et al. | |
| 6,915,290 B2 | 7/2005 | Bestgen et al. | |
| 7,047,232 B1 | 5/2006 | Serrano | |
| 7,080,062 B1 | 7/2006 | Leung et al. | |
| 7,133,861 B2 | 11/2006 | Day et al. | |
| 7,164,422 B1 | 1/2007 | Wholey, III et al. | |
| 7,167,850 B2 | 1/2007 | Stanfill | |
| 7,249,120 B2 | 7/2007 | Bruno et al. | |
| 7,359,922 B2 | 4/2008 | Young-Lai et al. | |
| 7,464,084 B2 | 12/2008 | Huang et al. | |
| 7,584,205 B2* | 9/2009 | Stanfill | G06F 17/30489 |
| 7,664,730 B2 | 2/2010 | Ziauddin et al. | |
| 7,856,462 B2 | 12/2010 | Huang et al. | |
| 7,945,562 B2 | 5/2011 | Ahmed et al. | |
| 7,953,891 B2 | 5/2011 | Blaszczak et al. | |
| 8,122,088 B2 | 2/2012 | Banatwala | |
| 8,412,746 B2 | 4/2013 | Fox et al. | |
| 8,538,985 B2 | 9/2013 | Betawadkar-Norwood et al. | |
| 8,875,145 B2 | 10/2014 | Atterbury et al. | |
| 9,116,955 B2 | 8/2015 | Schechter et al. | |
| 2003/0120682 A1 | 6/2003 | Bestgen et al. | |
| 2005/0108209 A1 | 5/2005 | Beyer et al. | |
| 2005/0278152 A1 | 12/2005 | Blaszczak | |
| 2006/0095466 A1 | 5/2006 | Stevens et al. | |
| 2006/0265362 A1 | 11/2006 | Bradford | |
| 2006/0294150 A1 | 12/2006 | Stanfill et al. | |
| 2007/0067274 A1 | 3/2007 | Han et al. | |
| 2007/0186036 A1 | 8/2007 | Bittner | |
| 2007/0271381 A1 | 11/2007 | Wholey et al. | |
| 2008/0049002 A1 | 2/2008 | Shinke et al. | |
| 2008/0049022 A1 | 2/2008 | Sherb et al. | |
| 2008/0151749 A1 | 6/2008 | Kawamura | |
| 2008/0256014 A1 | 10/2008 | Gould et al. | |
| 2008/0270646 A1 | 10/2008 | Wong | |
| 2009/0083313 A1 | 3/2009 | Stanfill et al. | |
| 2009/0125887 A1 | 5/2009 | Kahlon et al. | |
| 2009/0222404 A1* | 9/2009 | Dolin | G06F 17/30427 |
| 2009/0225082 A1 | 9/2009 | Hargrove et al. | |
| 2009/0254774 A1 | 10/2009 | Chamdani et al. | |
| 2010/0005077 A1 | 1/2010 | Krishnamurthy et al. | |
| 2010/0211953 A1 | 8/2010 | Wakeling et al. | |
| 2011/0029571 A1 | 2/2011 | Aggarwal et al. | |
| 2011/0072319 A1 | 3/2011 | Agarwal et al. | |
| 2011/0246448 A1 | 10/2011 | Tatemura et al. | |
| 2011/0276789 A1 | 11/2011 | Chambers et al. | |
| 2012/0246158 A1 | 9/2012 | Ke et al. | |
| 2014/0019949 A1 | 1/2014 | Craymer | |
| 2014/0032617 A1 | 1/2014 | Stanfill | |
| 2014/0280037 A1 | 9/2014 | Petride et al. | |

FOREIGN PATENT DOCUMENTS

| | | |
|---|---|---|
| CN | 1790324 | 6/2006 |
| EP | 0421408 | 4/1991 |
| EP | 2110761 | 10/2009 |
| EP | 2251785 | 11/2010 |
| FI | 944887 | 7/1997 |
| FI | 945495 | 9/1997 |
| FI | 951270 | 10/1997 |
| JP | 3-126169 | 5/1991 |
| JP | 8-16429 | 1/1996 |
| JP | 10-232875 | 9/1998 |
| JP | 10-340276 | 12/1998 |
| JP | 11-514116 | 11/1999 |
| JP | 2000148699 | 5/2000 |
| JP | 2003-505766 | 2/2003 |
| JP | 2003-099441 | 4/2003 |
| JP | 2006-236360 | 9/2006 |
| JP | 2009-181577 | 8/2009 |
| WO | WO 97/23826 | 7/1997 |

OTHER PUBLICATIONS

U.S. Appl. No. 14/746,188, filed Jun. 22, 2015, Processing Queries Containing a Union-Type Operation.

U.S. Appl. No. 14/563,066, filed Dec. 8, 2014, Source Code Translation.

Adamos, Panayiotis, et al., "Architectural Principles of the 'Streamonas' Data Stream Management System and Performance Evaluation based on the Linear Road Benchmark." 2008 International Conference on Computer Science and Software Engineering, Dec. 12, 2008, pp. 643-646.

Afrati et al., "Performance Considerations on a Random Graph Model for Parellel Processing", Informatique Theorique et Applications, vol. 27, No. 4, pp. 367-388, (1993).

Aho et al., "Universality of Data Retrieval Languages", ACM, pp. 110-120. 1979.

Apers et al., "PRISMA/DB: A Parallel, Main Memory Relational DBMS", IEEE, pp. 541-554 (1992).

Bodin, Francois et al., "A User Level Program Transformation Tool," ACM 1998, pp. 180-187.

Boral et al., "Prototyping Bubba: A Highly Parallel Database System", IEEE, vol. 2, No. 1 pp. 4-24, (Mar. 1990).

Braun, Peter, "Parallel Program Debugging Using Scalable Visualization",IEEE, pp. 699-708 (1995).

Canadian Office Action issued in application No. 2,2360,286, dated Jul. 27, 2005, 3 pages.

Chamberlin et al., "A History of Evaluation of System R", Communications of the ACM, vol. 24, No. 10, pp. 632-646, Oct. 1981.

Chinese Office Action issued in application No. 201180014176.7, on Jan. 7, 2015 (English translation).

Cimitile et al., "Incremental migration strategies: Data flow analysis for wrapping," IEEE Comput. Soc. US., pp. 59-68, Oct. 12, 1998, XP10309754.

DeWitt et al., "Parallel Database Systems: The Future of High Performance Database Systems", Communications of the ACM, vol. 35, No. 6, pp. 85-98, Jun. 1992.

DeWitt et al., "The Gamma Database Machine Project", IEEE, vol. 2, No. 1, pp. 44-62, (Mar. 1990).

Flat File Database http://en.wikipedia.org/w/index.php?title+Flat_file_database&oldid_336589178 as of Jan. 8, 2010.

(56) References Cited

OTHER PUBLICATIONS

Forrester Research's Ellen Carney Names Compact Solutions Among "Hot Insurance Tech Companies—2009", Jun. 29, 2009.
Graefe, "Encapsulation of Parallelism in the Volcano Query Processing System", ACM, pp. 102-111, 1990.
Graefe et al., "Encapsulation of Parallelism and Architecture Independence in Extensible Database Query Execution", IEEE, vol. 19, No. 8, pp. 749-764 (Aug. 1993).
Graefe, Goetze "Volcano—An Extensible and Parallel Query Evaluation System", IEEE, vol. 6, No. 1, pp. 120-135 (Feb. 1994).
International Search Report & Written Opinion, Patent Cooperation Treaty, issued in PCT application No. PCT/US2000/00934, mailed Jan. 4, 2011, 5 pages.
International Search Report & Written Opinion, Patent Cooperation Treaty, issued in PCT application No. PCT/US2011/021260, mailed Apr. 18, 2011, 12 pages.
International Preliminary Report on Patentability, PCT/US2011/021260, mailed May 24, 2012.
International Search Report & Written Opinion, PCT/US2012/035762, mailed Feb. 19, 2013, 14 pages.
Japanese Office Action, with English translation, JP Application No. 2012-549105, mailed Apr. 22, 2014, 9 pages.
Josifovski, Vanja, et al., "Optimizing Queries in Distributed and Composable Mediators." Cooperative Information Systems, 1999. COOPIS '99 Proceedings, 1999 I FCIS International Conference in Ediburgh, UK Sep. 2-4, 1999. Sep. 2, 1999, pp. 291-302.
Levy et al., "Querying Heterogeneous Information Sources Using Source Descriptions", Proceedings of the $22^{nd}$ VLDB Conference, Mumbai (Bombay), India, pp. 251-262, 1996.
Li et al., "Load Balancing Problems for Multiclass Jobs in Distributed/Parellel Computer Systems", IEEE, vol. 47, No. 3, pp. 322-332, (Mar. 1998).
Mackert et al., "R* Optimizer Validation and Performance Evaluation for Distributed Queries", Proceedings of the Twelfth International Conference on Very Large Data Bases, Kyoto, pp. 149-159, Aug. 1986.
Notice of Reasons for Rejection issued in Japanese Application No. 2000-594025, mailed Mar. 29, 2005, 3 pages.
"Relational algebra", http/en.wikipedia.org/wiki/Relational_algebra, Feb. 5, 2010.
Rim et al., "An Efficient Dynamic Load Balancing Using the Dimension Exchange Method for Balancing Quantized Loads on Hypercube Multiprocessors", IEEE, pp. 708-72 (1999).
Selinger et al., "Access Path Selection in a Relational Database Management System", ACM, pp. 23-34, 1979.
Seshadri, Sangeetha, et al., "Optimizing Multiple Queries in Distributed Data Stream Systems." Proceedings of the $22^{nd}$ International Conference on Data Engineering Workshops (ICDEW '06), Apr. 3, 2006, 6 pages.
Stanfill, Craig, "Massively Parallel Information Retrieval for Wide Area Information Servers", IEEE, pp. 679-682 (1991).
Stanfill, Craig, "The Marriage of Parallel Computing and Information Retrieval", IEEE, (2003).
Tjan, Bosco S., et al., "A Data-Flow Graphical User Interface for Querying a Scientific Database," 12602 Proceedings 1993 Symposium on Visual Languages, Aug. 24-27, 1993, 6 pages.
Unpublished U.S. Appl. No. 12/688,316, filed Jan. 15, 2010, 31 pages.
Japanese Office Action, with English translation, JP 2012-549105, mailed Mar. 25, 2015.
Transaction History, U.S. Appl. No. 09/229,849.
Transaction History, U.S. Appl. No. 13/098,823.
Transaction History, U.S. Appl. No. 14/563,066.
Transaction History, U.S. Appl. No. 14/628,643.
Transaction History, U.S. Appl. No. 12/688,316.
Japanese Office Action (English Translation) in Application No. 2014-509333, mailed Mar. 24, 2016 (9 pages).
Torrent Technical White Paper, "Orchestrator for the SAS System—Delivering Scalability and Performance to SAS Applications," pp. 1-30.
European Office Action in Application No. 12721999.6, Nov. 11, 2016 (10 pages).
Garcia-Molina et al., "Database Systems the Complete Book Second Edition—Chapter 16—The Query Compiler," Pearson Prentice Hall, XP055315926, Jun. 15, 2008.
Ozsu et al., "Principles of Distributed Database Systems—Chapter 9—Multidatabase Query Processing", Principles of Distributed Database Systems: Third Edition, Springer New York, NY XP055267246, Mar. 2, 2011.

* cited by examiner

MANAGING DATA QUERIES

CROSS-REFERENCE TO RELATED APPLICATIONS

This application claims priority to U.S. application Ser. No. 13/098,823, filed on May 2, 2011, incorporated herein by reference.

BACKGROUND

This description relates to managing data queries.

Data can be stored in databases and arranged in various forms such as database tables. A database table can contain a set of data having a common theme or purpose. The arrangement of a database table can be defined by a database scheme, and multiple database tables can have similar or identical arrangements. Further, the contents of a database and its associated database tables can change over time as data is adjusted, appended or deleted. Various techniques can be used to transfer data into and out of a database and to manipulate the data in the database.

SUMMARY

In one aspect, in general, a method of generating a dataflow graph representing a database query includes receiving a query plan from a plan generator, the query plan representing operations for executing a database query on at least one input representing a source of data, producing a dataflow graph from the query plan, wherein the dataflow graph includes at least one node that represents at least one operation represented by the query plan, and includes at least one link that represents at least one dataflow associated with the query plan, and altering one or more components of the dataflow graph based on at least one characteristic of the at least one input representing the source of data.

Aspects can include one or more of the following features. Altering one or more components of the dataflow graph includes removing at least one component of the dataflow graph. The component of the graph corresponds to an operation represented by the query plan. The at least one operation is capable of being performed by executable functionality associated with the source of data represented by the at least one input. A characteristic of the at least one input includes executable functionality associated with the source of data represented by the input. The executable functionality includes sorting functionality. Altering one or more components of the dataflow graph includes merging a first component representing a first operation applicable to a first input and a second component representing a second operation applicable to a second input into a single component, the single component representing a single operation equivalent to the first operation and the second operation, the single operation applicable to the first input and the second input. Altering one or more components of the dataflow graph includes merging a first input component representing a first source of data and a second input component representing a second source of data into a single input component, the single input component including an operation to access data of the first source of data and the second source of data. Altering one or more components of the dataflow graph includes removing a first component representing a first operation applicable to a first input and applying a second component to the first input, the second component representing a second operation corresponding to the same functionality as the first operation, and the second operation applicable to a second input. The method also includes identifying functionality associated with a database associated with a component representing the at least one source of data, and based on the identification, configuring the component to provide a database query to the database. The at least one input representing a dataset includes at least one of a data file, a database table, output of a second dataflow graph, and a network socket. Output of the dataflow graph is assigned to at least one of a data file, a database table, a second dataflow graph, and a network socket. The database query includes an SQL query. The dataflow graph includes a component configured to receive output from the plan generator.

In another aspect, in general, a computer-readable medium stores a computer program for generating a dataflow graph representing a database query, and the computer program includes instructions for causing a computer to receive a query plan from a plan generator, the query plan representing operations for executing a database query on at least one input representing a source of data, produce a dataflow graph from the query plan, wherein the dataflow graph includes at least one node that represents at least one operation represented by the query plan, and includes at least one link that represents at least one dataflow associated with the query plan, and alter one or more components of the dataflow graph based on at least one characteristic of the at least one input representing the source of data.

In another aspect, in general, a system for generating a dataflow graph representing a database query includes means for receiving a query plan from a plan generator, the query plan representing operations for executing a database query on at least one input representing a source of data, means for producing a dataflow graph from the query plan, wherein the dataflow graph includes at least one node that represents at least one operation represented by the query plan, and includes at least one link that represents at least one dataflow associated with the query plan, and means for altering one or more components of the dataflow graph based on at least one characteristic of the at least one input representing the source of data.

In another aspect, in general, a system for generating a dataflow graph representing a database query includes a computer system configured to receive a query plan from a plan generator, the query plan representing operations for executing a database query on at least one input representing a source of data, produce a dataflow graph from the query plan, wherein the dataflow graph includes at least one node that represents at least one operation represented by the query plan, and includes at least one link that represents at least one dataflow associated with the query plan, and alter one or more components of the dataflow graph based on at least one characteristic of the at least one input representing the source of data.

In another aspect, in general, a system for generating a dataflow graph representing a database query includes an interface in communication with a plan generator that provides a query plan, the query plan representing operations for executing a database query on at least one input representing a source of data, and a processor configured to produce a dataflow graph from the query plan provided by the plan generator, wherein the dataflow graph includes at least one node that represents at least one operation represented by the query plan, and includes at least one link that represents at least one dataflow associated with the query plan, and alter one or more components of the dataflow graph based on at least one characteristic of the at least one input representing the source of data.

DESCRIPTION

1 Databases, Queries, and Graphs

A database management system handles data stored in one or more databases. To store such data, database storage can take one or more forms such as database tables, which can be collections of data organized into data structures such as rows and columns. In one construct, each row represents a record of data, and each column represents a field within each of the rows.

The information contained in a database can be accessed and processed (e.g., modified) using database queries. A database query is a set of instructions describing a subset of the database contents and actions to take upon the data in that subset. For example, some database systems perform database queries written in a dedicated database query language such as Structured Query Language (SQL). In these database systems, an SQL query is the primary instrument for manipulating the contents of the database.

In some implementations, database queries and other computations are associated with a database management system in a graphical representation. For example, data may be represented as passing through a collection of operations, referred to as a dataflow. In one arrangement, a dataflow may be provided through a directed graph, with components of the computation being associated with the vertices of the graph and dataflows between the components corresponding to links (arcs, edges) of the graph. A graph is a modular entity and may be connected to or combined with other modular graphs. Each graph can be made up of one or more other graphs, and a particular graph can be a component in a larger graph. A graphical development environment (GDE) provides a user interface for specifying executable graphs and defining parameters for the graph components. A system that implements such graph-based computations is described in U.S. Pat. No. 5,966,072, EXECUTING COMPUTATIONS EXPRESSED As GRAPHS, which is incorporated herein by reference in its entirety.

Figure 1:
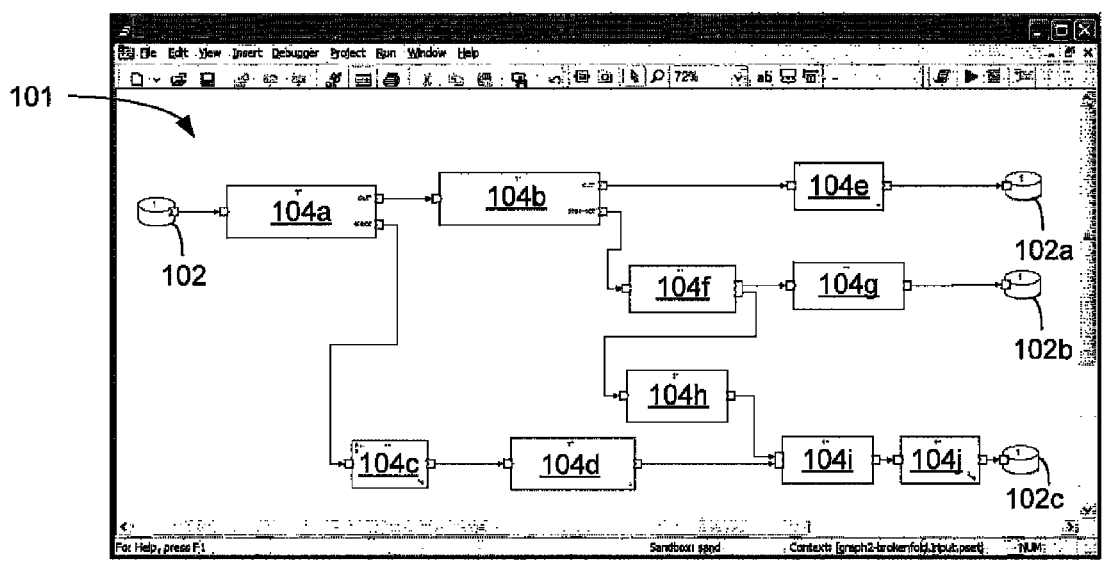
FIG. 1 is a block diagram of a dataflow graph.

Referring to FIG. 1, an example of a dataflow graph 101 (as represented in an exemplary user interface) includes an input component 102 providing a collection of data to be processed by the executable components 104a-104j of the dataflow graph 101. In some examples, the input component 102 is a data source that can include data records associated with a database system or transactions associated with a transaction processing system. The data records may be stored in various forms such as a database table, for example. Each executable component 104a-104j is associated with a portion of the computation defined by the overall dataflow graph 101. Work elements (e.g., individual data records from the data collection or database table) enter one or more input ports of a component, and output work elements (which are in some cases the input work elements, or processed versions of the input work elements) typically leave one or more output ports of the component. In dataflow graph 101, output work elements from components 104e, 104g, and 104j are stored in output data components 102a-102c.

The input component 102 and the output data components 102a-102c, for example, could each provide access to any one of a data file, a database table, output of a second dataflow graph, a network socket, or another source of data.

Some graph-based database systems are used to process database queries. For example, a database query can be applied to one or more database tables to extract an identified subset of the database table contents, for example, for processing in a dataflow. In some implementations, a graph-based database system accepts and executes database queries in the form of dataflow graphs. Other database systems may use other types of database queries.

In some cases, one or more database tables are moved to a graph-based database system from another kind of database system that uses SQL. The other database system may have many SQL queries already written that are incompatible with the graph-based database system. In some implementations, the SQL queries can be converted to database queries compatible with the graph-based database system.

Figure 2:
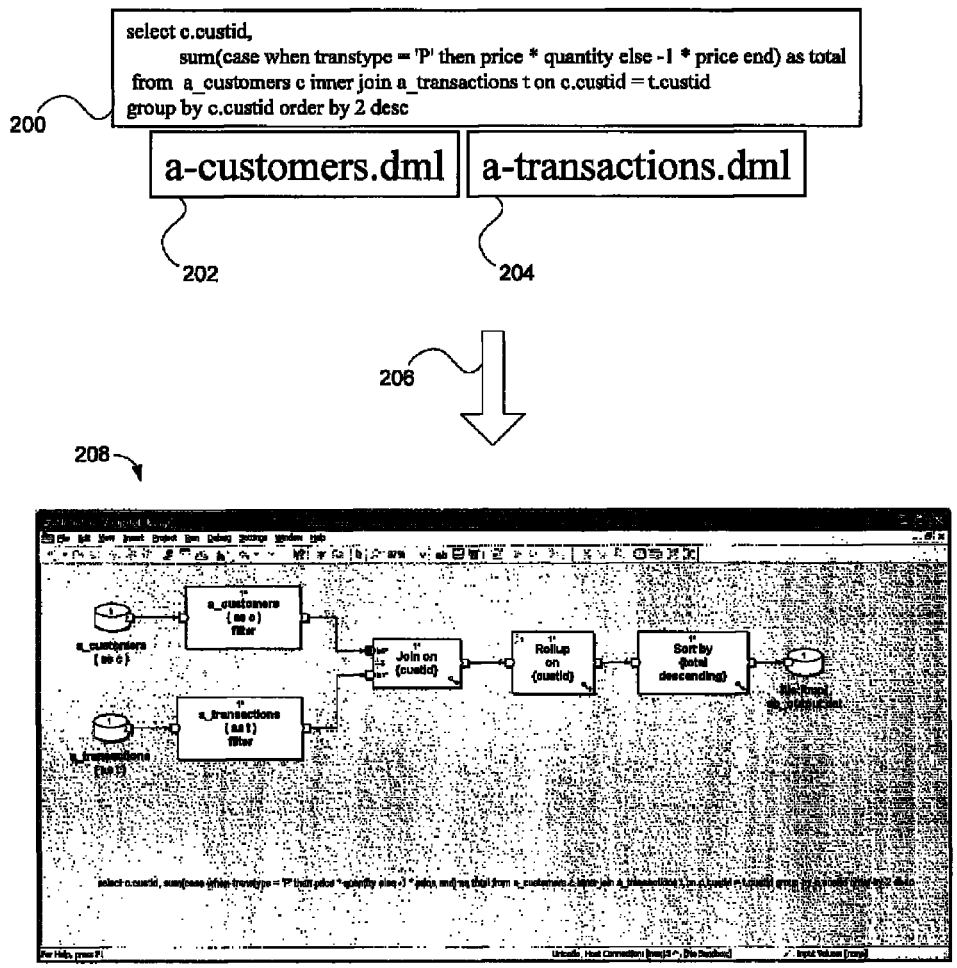
FIG. 2 illustrates a database query and a dataflow graph.

FIG. 2 shows an example of a database query 200 written in SQL. This example database query 200 is intended to operate on database tables 202, 204 managed by a graph-based database management system. The graph-based database management system can recognize the data in the database tables 202, 204 because the database tables are in a format native to the graph-based database management system. The database tables 202, 204 might contain data obtained from other database tables, for example, database tables originating from a database system that recognizes SQL queries and does not use dataflow graphs.

However, the graph-based database management system may not have built-in functionality for processing SQL queries, so a graph-based database query can be produced to emulate the SQL database query 200. The graph-based database query is recognizable by the graph-based database system. For example, the database query 200 can be converted 206 (using techniques described herein) from an SQL query into a dataflow graph 208. The dataflow graph 208 operates on the database tables 202, 204 by accepting them as input, and provides the execution results of the database query 200 as output.

2 Query Plans

Some database systems carry out database queries such as SQL queries based on a query plan (also sometimes called an explain plan). A query plan is a description of the database operations that may be performed if the database query is executed. The query plan may describe one possible arrangement of database operations, even if other arrangements of the operations or a different set of operations would accomplish the same result.

To provide such query plans, a database system may include a query plan generator (also sometimes called a query planner). For example, the query plan generator can produce a query plan when a database query is being executed, or the query plan generator can generate a query plan before any decision about executing the query is made.

In some arrangements, database operations may be executed in various orders while still providing equivalent outputs. As such, the query plan generator may have functionality that determines an optimal query plan. For example, an optimal query plan could be the query plan that describes the arrangement of database operations for executing the database query in the least amount of time, or using the least amount of database resources such as data storage space, or otherwise accomplishing the database query within constraints that have been identified by the database system. The query plan generator's functionality for determining an optimal query plan may include functionality that scores or ranks many possible query plans, and may also include functionality that rearranges possible query plans to an optimal or efficient configuration.

A single database query can be executed multiple times, and each execution could have a unique optimal query plan. For example, the data within a database table could change between two executions of a database query. In this example, the operations described in the query plan that was generated for the first execution of the database query may need more or less execution time during the second execution of the database query than during the first execution. In this case, a different arrangement of operations may be better suited to the second execution of the database query, for example, a different arrangement of the same operations, or an arrangement of different operations. A query plan optimized for the second execution of the database query can be generated for that execution, taking into account the momentary state of the database table.

3 System Overview

Figure 3:
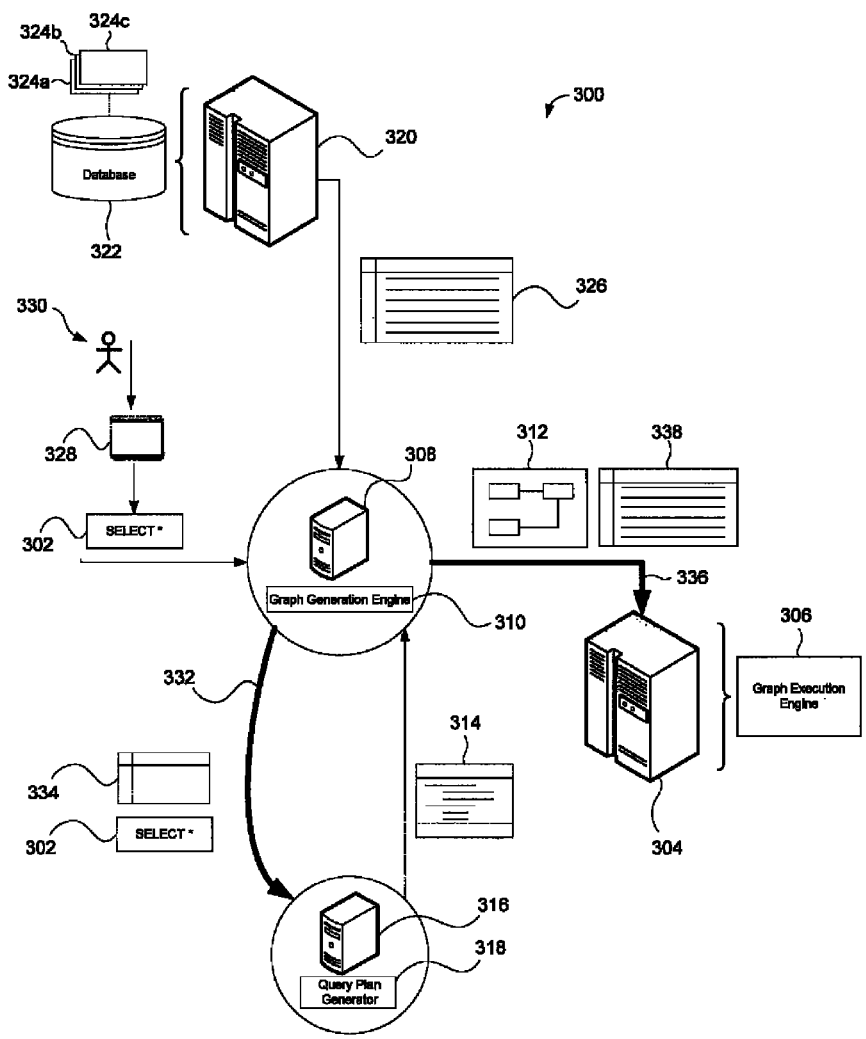
FIG. 3 is an overview of a database system and associated components.

A query plan generator can be used in producing a graph-based database query that emulates another kind of database query such as an SQL query. FIG. 3 shows a database query management system 300 for preparing a database query 302 for execution on a database management computer system 304. The database management computer system 304 shown includes a graph execution engine 306 that handles database operations implemented as dataflow graphs. The database query management system 300 also includes a graph generation computer system 308 having a graph generation engine 310 that can build a dataflow graph 312 from a description of operations to be performed by the dataflow graph. For example, the description of operations could be a query plan 314. The graph generation computer system 308 is configured with the ability to alter components of the dataflow graph based on one or more characteristics of an input representing a source of data, as described in more detail below in section 6 describing "federated queries."

The database query management system 300 also includes a query planning computer system 316 that executes a query plan generator 318. The query plan generator 318 can be any query plan generator that produces a query plan from a database query, and need not be designed with any functionality related to dataflow graphs or graph generation. Further, the database query management system 300 also includes a database computer system 320 having a database 322 in a data storage (e.g. a hard drive, optical disc, etc.) and containing one or more database tables 324a, 324b, 324c.

Although separate computer systems are shown for the database management computer system 304, the graph generation computer system 308, the query planning computer system 316, and the database computer system 320, two or more of these computer systems could be the same computer system, or components of the same computer system. All of the computer systems have at least one processor for executing their respective executable components and at least one data storage system. The computer systems can be connected to each other using a computer network such as a local area network (LAN), a wide-area network (WAN), a network such as the Internet, or another kind of computer network.

To demonstrate the production of a dataflow graph 312 from one or more database queries 302, a database query and a database table 326 are received and processed by the graph generation computer system 308 prior to an execution of the dataflow graph. The graph generation computer system 308 receives the database table 326 from the database computer system 320.

The database table 326 can take any of several forms. For example, the database table 326 could be a relational database table, a partial database table, a flat file, or another kind of data file or collection of data files. In some examples, the database table 326 could be received in the form of information about the database table, e.g. metadata about the database table, or a description of the database table.

In some implementations, the database table 326 could be identified by a data registry associated with the database computer system 320 or otherwise accessible to the graph generation computer system 308. The data registry could be in the form of lookup file catalog, for example, which may contain a data file location associated with the database table 326, and primary key and index information associated with the database table. The data registry could also provide information about the data formats for different types of database tables. Further, the data registry could also provide information about how a dataflow graph 312 can access the database table.

The graph generation computer system 308 also receives a database query 302 to be applied to the database table 326. For example, the database query could be an SQL query. The database query 302 could be received from any number of possible sources. For example, the database query 302 could be received from a user interface 328 where a user 330 has entered the database query. In some examples, the database query 302 is received from a data storage system, or the database query is received from a computer network such as the Internet, or the database query is generated based on another previously-received database query.

In some implementations, the graph generation computer system 308 provides (as represented by an arrow 332) a version of the database table 326 to the query planning computer system 316, produced from information about the database table 326. For example, the version of the database table 326 provided to the query planning computer system 316 could be a structural representation 334 of the database table that is smaller in size than the database table and thus requires fewer computational resources to process. The structural representation 334 of the database table 326 may contain information about the database table, but is absent some or all of the data of the database table. For example, the structural representation 334 of the database table 326 could contain a format that reflects the format of the database table, such as the columns, rows, or fields of the database table. The structural representation 334 of the database table 326 could also contain information about the data, such as data storage sizes of elements in the database table, or the data types of elements in the database table.

The graph generation computer system provides (as represented by the arrow 332) the database query 302 and the structural representation 334 of the database table 326 to the query planning computer system 316. The query planning computer system 316 executes the query plan generator 318, which produces a query plan optimized for executing the database query 302 over the database table 326. The structural representation 334 of the database table 326 supplies the same information used by the query plan generator 318 as would be supplied by the database table 326 itself, for example, data sizes, data types, and other information about the data contained in the database table. In some implementations, the structural representation 334 of the database table 326 includes an index of data elements that is used to optimize data lookup and retrieval. The query plan generator 318 can use the index to calculate the speed of identifying and retrieving data elements from the indexed database table 326.

The graph generation computer system 308 receives a query plan 314 from the query planning computer system 316. The query plan 314 describes an arrangement of database operations that can be used to execute the database query 302 over the database table 326. For example, the operations in the query plan 314 can correspond to nodes of a dataflow graph 312. The query plan 314 can also include information about the data types used by the operations in the query plan. For example, the operations in the query plan could have parameters, and the data types of the parameters could be described in the query plan.

Once produced, the query plan 314 is provided to the graph generation computer system 308 for dataflow graph 312 production by the graph generation engine 310. The graph generation engine 310 outputs a dataflow graph 312 corresponding to the query plan 314. In some implementations, the dataflow graph 312 has nodes representing operations described in the query plan, and node links representing flows of data between the operations. Because a dataflow graph 312 may be generated for each instance of preparing a database query for execution, the graph generation engine 310 can generate a dataflow graph quickly enough to respond to real-time requests to execute a database query. In some implementations, the graph generation engine 310 can generate a dataflow graph from a query plan in less than one second.

The graph generation computer system 308 provides (represented by an arrow 336) the dataflow graph 312 generated by the graph generation engine 316 to the database management computer system 304. In some implementations, the graph generation computer system 308 also prepares the database table 326 for use by the database management computer system and provides the prepared database table 338. For example, graph generation computer system 308 might convert the database table 326 from a format used by the graph generation computer system 308 to a format used by the database management computer system 304.

Figure 4:
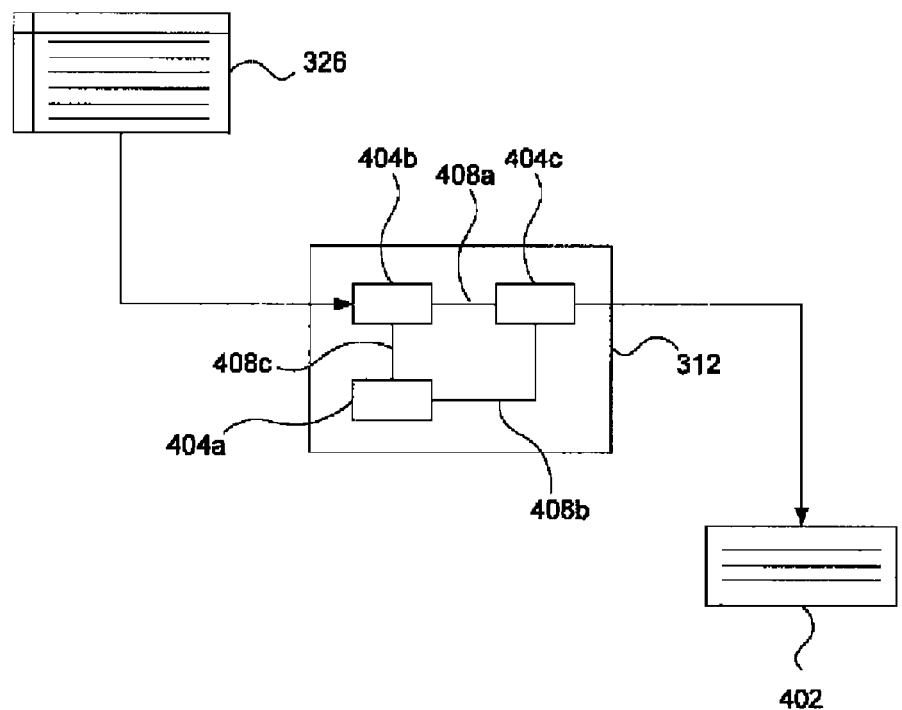
FIG. 4 represents the execution of a dataflow graph.

Once provided to the database management computer system 304, the dataflow graph 312 is prepared for execution. As shown in FIG. 4, the database management computer system 304 can execute operations of the dataflow graph 312 and use the database table 326 in order to produce results 402 of the database query. The database management computer system 304 provides the database table 326 to one or more nodes 404a, 404b, 404c of the dataflow graph 312 and executes the dataflow graph using the graph execution engine 306. The graph execution engine 306 performs the operations represented by the nodes 404a, 404b, 404c of the dataflow graph 312, which correspond to database operations for executing the underlying database query. Further, links 408a, 408b, 408c between the nodes represent flows of data between the database operations as the database table is processed. The dataflow graph 312 outputs the results 402 of the database query.

4 Structural Representation

Figure 5:
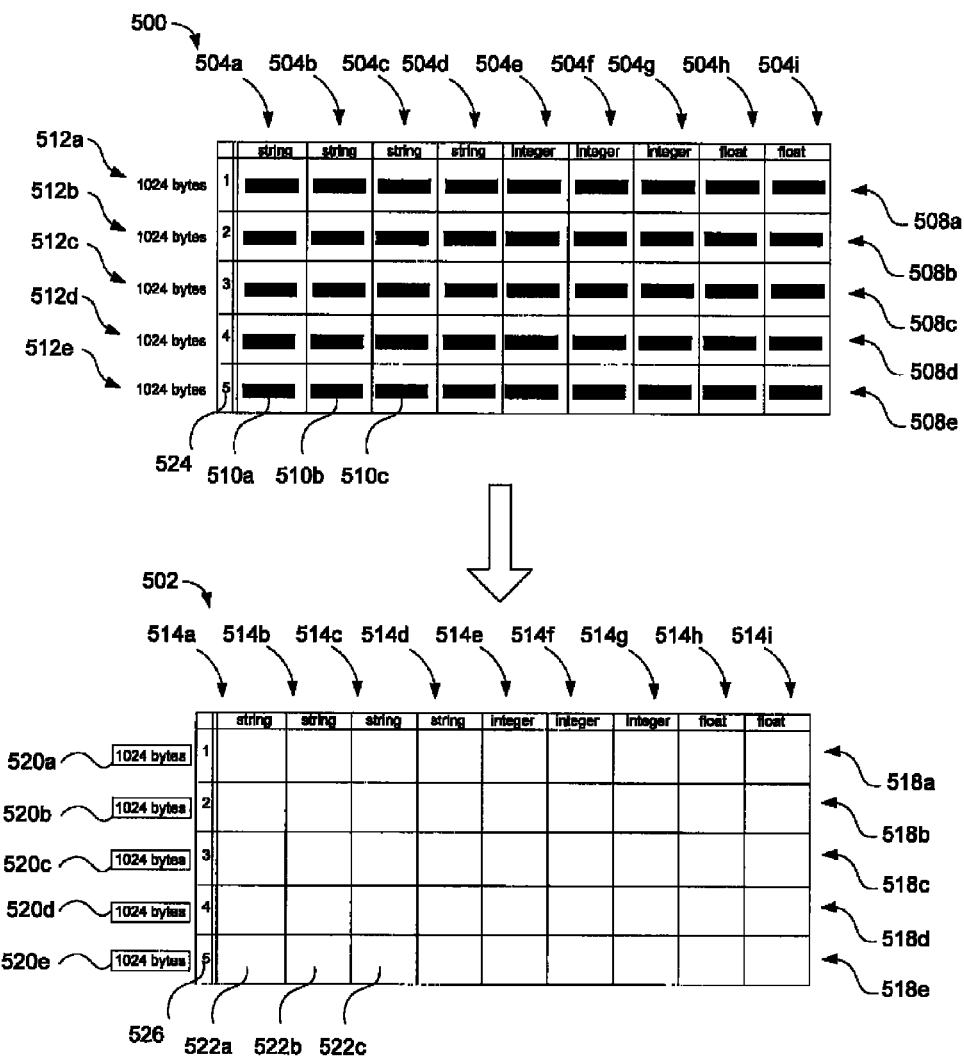
FIG. 5 is a database table and a structural representation of a database table.

FIG. 5 shows an example of a database table 500 and a structural representation 502 of the database table (containing none of the data from the database table). The database table 500 has columns 504a-504i that may contain similar or different types of data. The database table 500 also has rows 508a-508e each containing a field corresponding to each column. Each field of a row contains a data element 510a, 510b, 510c of the data type of the corresponding column (e.g. character string, integer, floating point number, etc.). Further, each row 508a-508e has an inherent data storage size 512a-512e. For example, the data storage size 512a-512e might be the amount of storage space used by the data elements of the row when the row resides in data storage such as memory.

The structural representation 502 of the database table 500 (produced by the graph generation computer system 308 as shown in FIG. 3) has columns 514a-514i identical to the database table, including the same data types as the original columns 504a-504i. The structural representation 502 of the database table 500 also has rows 518a-518e corresponding to the rows 508a-508e of the database table. However, the rows 518a-518e do not contain the data elements 510a, 510b, 510c from the database table 500. Each row 518a-518e is associated with a data storage size value 520a-520e. While the data storage size 512a-512e of a row in the database table 500 could be calculated from the data storage sizes of the individual data elements 510a, 510b, 510c, the data storage size value 520a-520e of each row 518a-518e can itself be a data element stored alongside each row in the structural representation 502 of the database table. The total data storage size of the structural representation 502 of the database table 500 may be a small percentage of the total data storage size of the database table, because the fields 522a, 522b, 522c of the structural representation of the database table are absent the data elements 510a, 510b, 510c from the fields of the database table. In some implementations, the structural representation 502 of the database table 500 may retain some data elements from the database table, for example, the structural representation of the database table may retain data elements corresponding to key values 524, 526 or other data elements used in the structure, organization, or format of the database table. In some implementations, the structural representation 502 of the database table 500 may contain an index or another data structure that provides information used in data retrieval. In some implementations, the structural representation 502 of the database table 500 may contain other statistics about the data contained in the database table.

5 Function Calls

Figure 6:
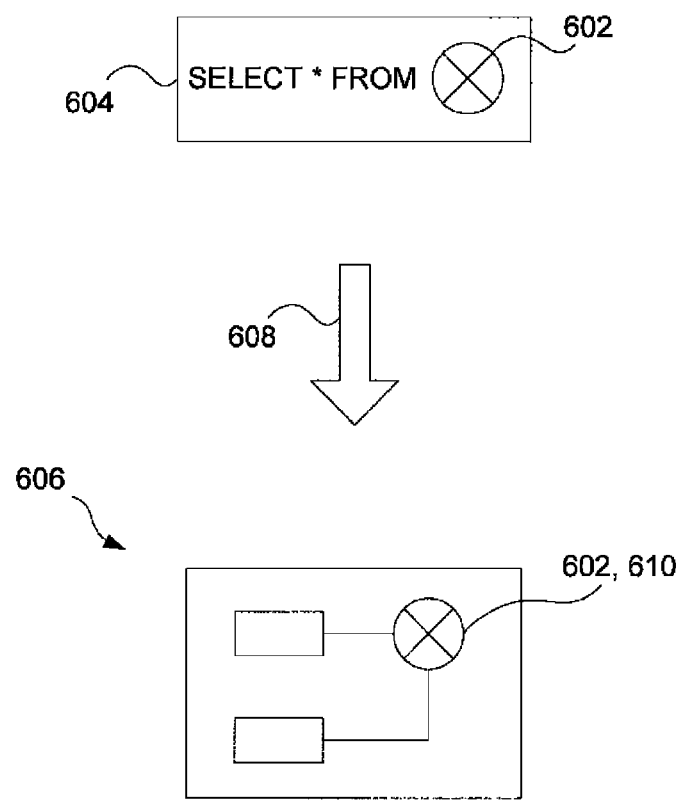
FIG. 6 illustrates a database query and a dataflow graph each containing an executable function.

As shown in FIG. 6, in some implementations, a custom graph function 602 can be embedded in a database query 604. For example, the custom graph function 602 might represent an operation that a dataflow graph 606 can carry out during the execution of the dataflow graph. The custom graph function 602 might not have any functionality within the context of the database query 604, and is placed in the database query to be passed to the generated dataflow graph 606. For example, the custom graph function 602 might be added to a database query 604 to prepare it for conversion to a dataflow graph but replacing or augmenting part of the existing database query. Further, the query plan generator might not have information about the functionality of the custom graph function 602. The custom graph function 602 may be a function that has no equivalent function in the language of the database query 604. In some implementations, the query plan generator may be aware of the input data type or output data type for the custom graph function 602. When the dataflow graph 606 is generated 608, the custom graph function 602 could act as a node 610 of the dataflow graph.

In some implementations, the custom graph function 602 may be a function used for accessing data in a special or customized format, or the custom graph function may be a function used to execute a regular expression or pattern matching expression, or the custom graph function may be a function implemented by a user, for example, a user of the database management computer system.

6 Federated Queries

In some implementations, a query plan generator (e.g., query plan generator 318 shown in FIG. 3) can operate on a database query that is constructed to operate on input data acquired from multiple data sources and/or multiple types of data sources. For example, the database query could be constructed to operate on multiple database tables, and the database tables may belong to databases of different types and having different internal functionality. Also, the database query could be constructed to operate on data accessible in other data sources such as multiple data files, multiple network sockets, multiple outputs of other dataflow graphs, or any combination of these types of data sources or other types of data sources that can be accessed using a database query. When the graph generation engine generates a dataflow graph from a query plan, the resulting dataflow graph can be optimized for accessing each input representing a data source based on characteristics of the respective data sources, depending on the number and respective types of the data sources.

Figure 7:
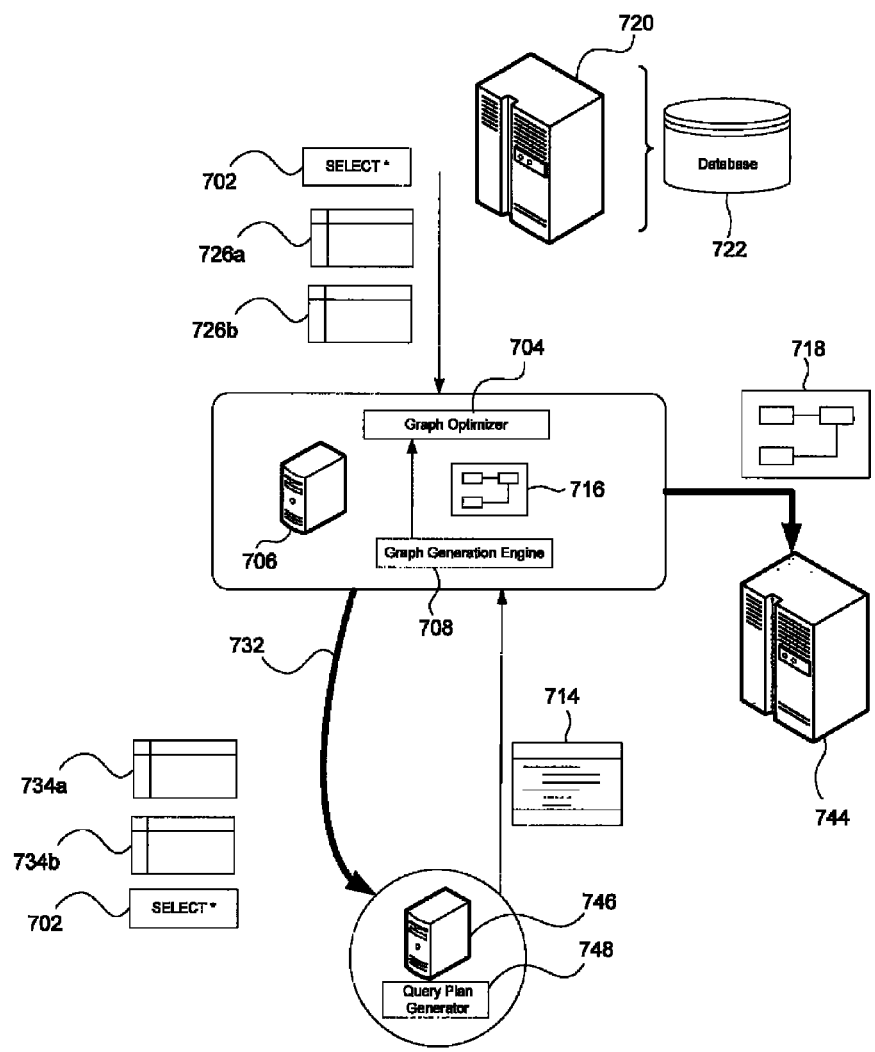
FIG. 7 is an overview of a database system and associated components.

FIG. 7 shows a graph generation computer system 706 that includes a graph generation engine 908 and a graph optimizer 704. The graph generation computer system 706 receives one or more database tables 726a, 726b. For example, the graph generation computer system 706 may receive the database tables 726a, 726b from one or more database computer systems, e.g., a database computer system 720 having a database 722 in a data storage system (e.g., a hard drive, optical disc, etc.). The graph generation computer system 706 also receives a database query 702 to be applied to the database tables 726a, 726b. For example, the database query 702 could be received from a user interface, or, the database query 702 could be received from a data storage system, or the database query could be received from a computer network such as the Internet, or the database query could be generated based on another previously-received database query.

The graph generation computer system 706 provides (as represented by an arrow 932) versions 734a, 734b of the database tables 726a, 726b to a query planning computer system 746. In some implementations, the versions 734a, 734b of the database tables 726a, 726b are the database tables 726a, 726b themselves. In some examples, the versions 734a, 734b of the database tables 726a, 726b are structural representations of the database tables 726a, 726b. For example, the versions 734a, 734b of the database tables 726a, 726b could be structural representations formatted in the same manner as the structural representation 502 of a database table 500 shown in FIG. 5.

The graph generation computer system 706 provides (as represented by the arrow 932) the database query 702 and versions 734a, 734b of the database tables 726a, 726b to the query planning computer system 746. The query planning computer system 746 executes a query plan generator 748, which produces a query plan 714 for executing the database query 702 over the database tables 726a, 726b. In some implementations, if the versions 734a, 734b of the database tables 726a, 726b are structural representations of the database tables 726a, 726b, the structural representations supply the same information used by the query plan generator 748 as would be supplied by the database tables 726a, 726b themselves.

The graph generation computer system 706 receives the query plan 714 from the query planning computer system 746. Like the query plan 314 shown in FIG. 3, this query plan 714 describes an arrangement of database operations that can be used to execute the database query 702 over the database tables 726a, 726b. The graph generation computer system 706 executes the graph generation engine 908 using as input the query plan 714. The graph generation engine 908 generates a dataflow graph 716 based on the contents of the query plan 714. In some implementations, the dataflow graph 716 has nodes representing operations described in the query plan 714, and node links representing flows of data between the operations.

The dataflow graph 716 can be converted by a graph optimizer 704 to an optimized dataflow graph 718. In some implementations, the dataflow graph 716 can be executed by a computer system (for example, a database management computer system 744) to carry out operations corresponding to operations defined by the query plan 714. Some of the operations carried out by the dataflow graph 716 may be redundant and can be removed or consolidated with other operations. For example, the dataflow graph 716 may include a group of components that can be merged into a single component that performs the same operations as would the group of components. The graph optimizer 704 analyzes the dataflow graph 716 and performs an optimization to alter the dataflow graph, for example, to remove redundant components, merge components, and otherwise reduce the number of components in the dataflow graph 716 to generate the optimized dataflow graph 718. After the optimized dataflow graph 718 is generated, the optimized dataflow graph 718 can be provided to the database management computer system 744 for execution.

In some implementations, the dataflow graph 716 and/or the optimized dataflow graph 718 contains a component that is configured to provide output (e.g., a query plan 714) of the query plan generator 748 to other components of the dataflow graph 716. For example, the dataflow graph 716 or the optimized dataflow graph 718 may receive a database query 702 during execution ("on the fly") and so a component of the dataflow graph 716 or the optimized dataflow graph 718 can, also during execution, request a query plan 714 corresponding to the database query 702 from the query plan generator 748. The component providing output of the query plan generator 748 can then provide the query plan 714 to other components of the dataflow graph 718.

In some implementations, the graph optimizer 704 may increase the number of components in the dataflow graph 716 when generating the optimized dataflow graph 718. For example, the dataflow graph 716 may operate faster or more efficiently when executed if a complex component is replaced by a group of more efficient components.

In some implementations, the graph generation computer system 706 includes a query plan optimizer that operates on the query plan 714, and the query plan 714 is optimized before being converted to a dataflow graph.

Figure 8:
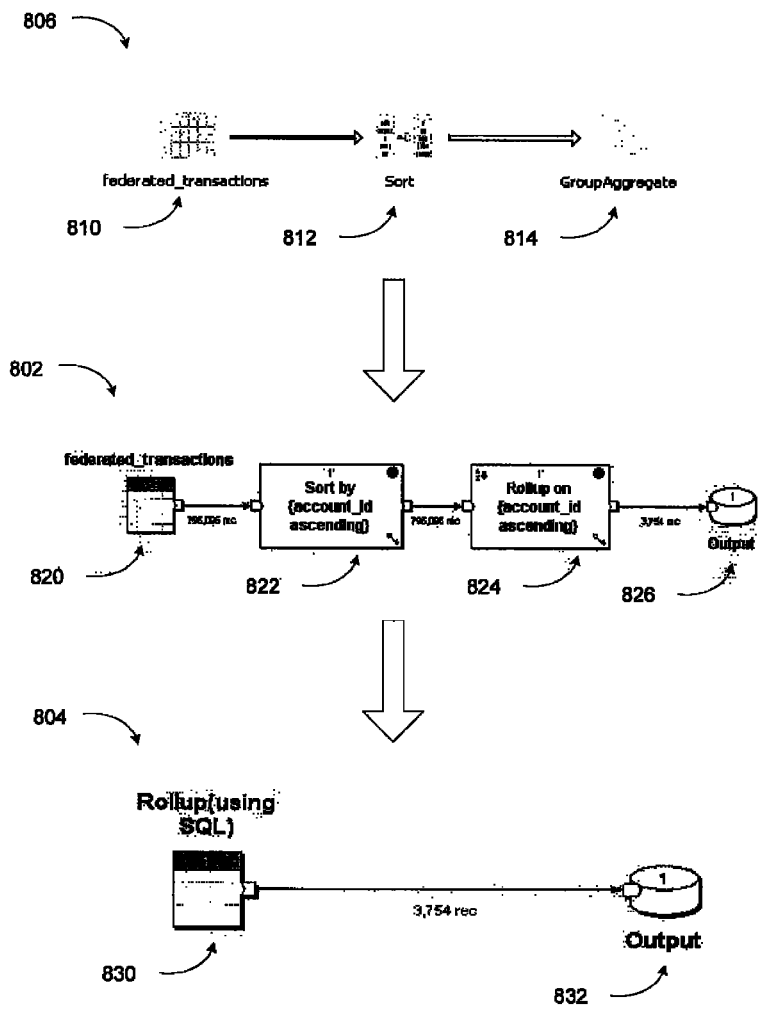
FIG. 8 illustrates a query plan and dataflow graphs.

FIG. 8 shows an example of a dataflow graph 802 generated from a query plan 806 and an optimized data flow graph 804. The query plan 806 represents the following SQL query:

```
select count(*) as num_transactions,
    sum(transaction_amt) as total,
    account_id
from federated_transactions
    group by account_id
    order by account_id
```

This SQL query selects records from a database table called federated_transactions and groups and orders them. The query plan 806 describes three operations that can be performed to execute the query. The operations of the query plan 806 are a data selection operation 810, a sort operation 812, and a data summarization operation called a group aggregate operation 814. These operations can be translated to a dataflow graph 802 having components that approximately correspond to the operations. The dataflow graph 802 has a data selection component 820, a sort component 822, a data summarization component called a rollup component 824, as well as an output component 826.

The data selection component 820 represents a source of data. For example, the data selection component 820 could be a database table, output of a second dataflow graph, a network socket, or another source of data.

The output component 826 represents a data destination. For example, the output component 826 could be any one of a data file, a database table, an input to a second dataflow graph, a network socket, or another destination for output data.

The data selection component 820 may represent a source of data that has executable functionality. For example, the data selection component 820 may represent a database table in a database that can execute database queries and returns data based on an executed database query such as the SQL query shown above. The dataflow graph 802 may have access to the functionality associated with the database storing the database table. For example, the dataflow graph 802 may have a component that can send a request to the database to perform operations associated with the executable functionality.

In some implementations, the SQL query operates on data belonging to the database. For example, the federated_transactions database table represented by the data selection component 820 may belong to a database that can perform the same functions as performed by the sort component 822 and the rollup component 824. An optimized dataflow graph 804 can be generated from the query plan 806 that takes advantage of this built-in functionality. The optimized dataflow graph 804 only has two components, a data selection component 830 that includes the rollup functionality, and an output component 832.

The optimized dataflow graph 804 may have fewer components than the dataflow graph 802 generated directly from the query plan 806, and the optimized dataflow graph 804 may also operate more efficiently. For example, in the example shown, the dataflow graph 802 selects 796,096 records from the federated_transactions database table, which are reduced in number to 3,754 records once the rollup operation is complete. The optimized dataflow graph 804 need not take the step of selecting and processing the full number of 796,096 records, however, because it acquires the already sorted and summarized 3,754 records.

Figure 9:
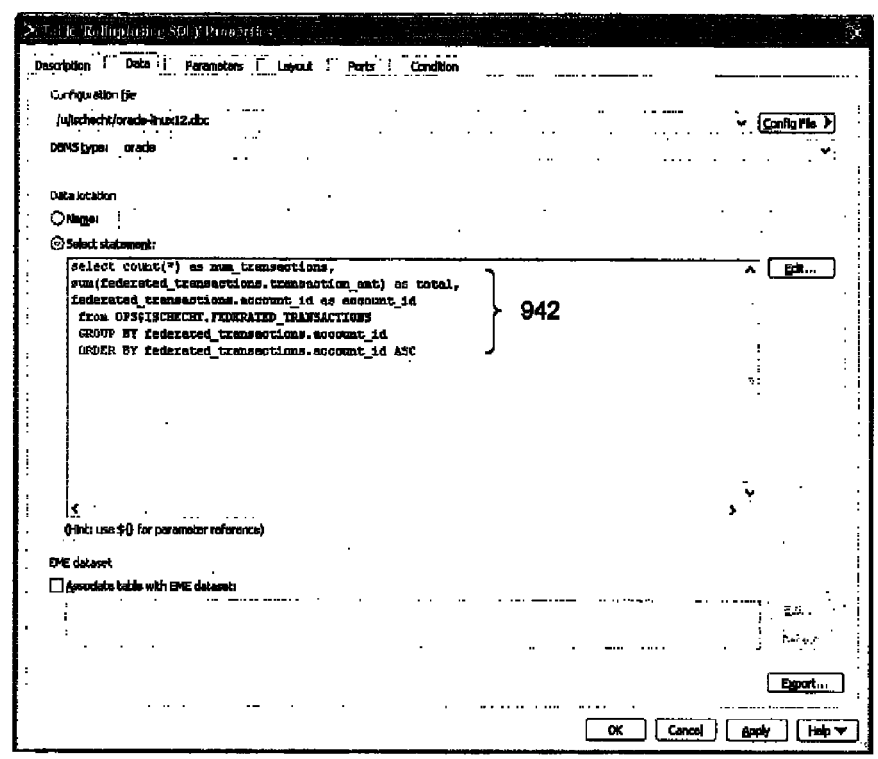
FIG. 9 illustrates a database query user interface.

In some implementations, the optimization can be performed by translating a portion of the query plan 806 back into a query appropriate for the data source having the functionality being utilized by the optimized dataflow graph 804. FIG. 9 shows an example of a user interface 940 associated with the data selection component 830 of the optimized dataflow graph 804. The user interface 940 allows the data selection component 830 to be configured with a SQL query 942. When the dataflow graph 804 associated with the data selection component 830 is executed, the SQL query 942 is delivered to the source of data represented by the data selection component 830 and executed by database functionality associated with the data selection component 830. For example, if the data selection component 830 is associated with a database 722 stored by a database computer system 720 (FIG. 7), the SQL query 942 can be delivered to the database computer system 720 for execution. In this way, the data selection component 830 can use the SQL query 942 to access functionality associated with the database 722.

Figure 10:
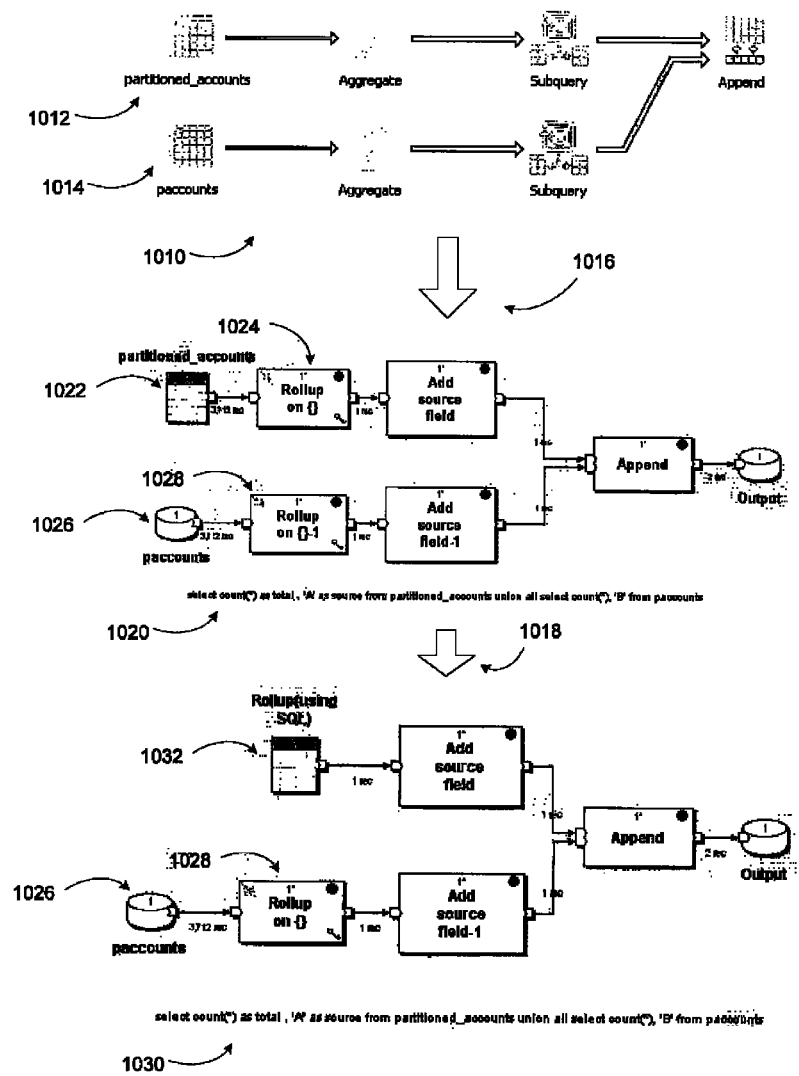
FIGS. 10-11 illustrate a query plan and dataflow graphs.

Dataflow graphs representing query plans having multiple sources of data as inputs can be optimized based on characteristics of the multiple inputs. FIG. 10 shows a query plan 1010 undergoing transformation to an optimized dataflow graph 1030. The query plan 1010 represents a federated query and has two database tables 1012, 1014 as input. The query plan can be converted 1016 to a dataflow graph 1020. For example, the graph generation engine 908 shown in FIG. 7 can perform the conversion.

The dataflow graph 1020 includes a data selection component 1022 representing one of the database tables 1012 and a data component 1026 representing the other database table 1014. The data selection component 1022 outputs data to a rollup component 1024 and the data component 1026 outputs data to a second rollup component 1028. The data selection component 1022 has internal functionality that can be used to perform the same operations as the rollup component 1024 performs within the dataflow graph 1020. For example, the data selection component 1022 may represent a database system that has executable functionality and can perform its own operations on the data that it provides. For example, the data selection component 1022 could represent a database table accessible on a database such as the database 722 shown in FIG. 7.

The data component 1026 does not have functionality that can be used to perform the same operations as the rollup component 1028 performs within the dataflow graph 1020. For example, the data component 1026 may be an entity such as a data file that does not include executable functionality.

The dataflow graph 1020 can be converted 1018 (e.g., by a graph optimizer such as the graph optimizer 704 shown in FIG. 7) to an optimized dataflow graph 1030 in which some of the components have been removed based on the internal functionality of the data selection component 1022 and the data component 1026. Because the data selection component 1022 includes rollup functionality, the data selection component 1022 and its associated rollup component 1024 can be merged into a combined data selection component 1032 incorporating the rollup operations otherwise performed by the rollup component 1024. The combined data selection component 1032 can be provided a database query instructing the combined data selection component 1032 to perform the rollup operations before providing data to the optimized dataflow graph 1030. For example, the combined data selection component 1032 can be provided a database query such as the SQL query 942 shown in FIG. 8. The rollup component 1028 associated with the data component 1026 remains in the optimized dataflow graph 1030 because the data component 1026 does not have internal rollup functionality that is otherwise duplicated by the rollup component 1028.

Figure 11:
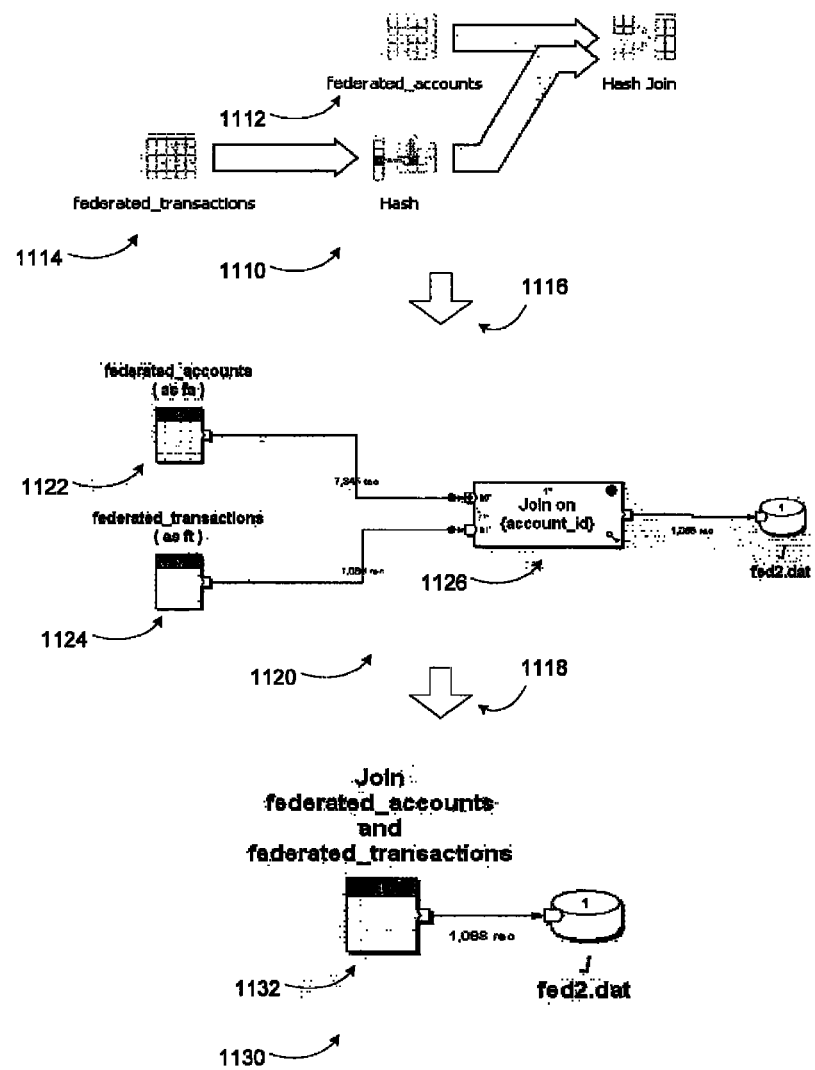

FIG. 11 shows a query plan 1110 undergoing transformation to an optimized dataflow graph 1130. The query plan 1110 represents a federated query and has two database tables 1112, 1114 as input. The query plan can be converted 1116 to a dataflow graph 1120. For example, the graph generation engine 908 shown in FIG. 7 can perform the conversion.

The dataflow graph 1120 contains components corresponding to operations of the query plan 1110. This dataflow graph 1120 includes data source components 1122, 1124 representing the database tables 1112, 1114 of the query plan 1110, and also includes a join component 1126 that operates on the data provided by the data source components 1122, 1124 to combine the data of the database tables 1112, 1114 into a single source of data.

The database tables 1112, 1114 may belong to the same database, e.g., a database 722 shown in FIG. 7. The database 722 may have functionality that can provide the data of the two database tables 1112, 1114 as a single source of data, e.g., a single database table that is the result of a join operation. A graph optimizer, e.g., the graph optimizer 704 shown in FIG. 7, can identify the functionality of the database 722 associated with the database tables 1112, 1114 and determine whether the dataflow graph 1120 can be simplified by reducing the number of components in the dataflow graph 1120. The graph optimizer 704 can determine that the database 722 can perform a join operation on the database tables 1112, 1114 and generate an optimized dataflow graph 1130 containing a merged data source component 1132 representing data that is provided by the database 722 when the database 722 performs the join operation upon the two database tables 1112, 1114. The optimized dataflow graph 1130 does not contain the join component 1126 because the functionality represented by the join component 1126 is instead performed by the database 722.

Figure 12:
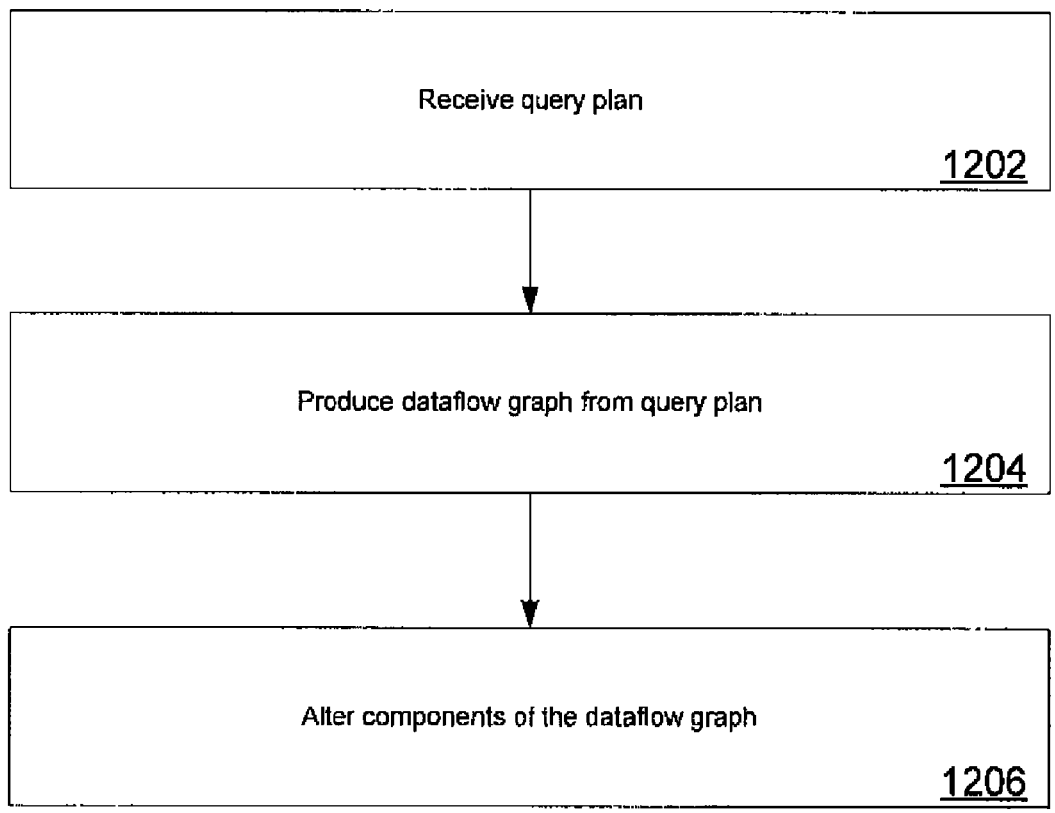
FIG. 12 is a flowchart for operations of a database system.

FIG. 12 is a flowchart 1200 showing exemplary operations of a graph generation computer system 706 (shown in FIG. 7). In step 1202, the graph generation computer system receives a query plan, for example, a query plan produced by a query plan generator of a query planning computer system. The query plan represents operations for executing a database query on at least one input representing a source of data. In step 1204, the graph generation computer system uses a graph generation engine to produce a dataflow graph from the query plan based on the operations described in the query plan. The resulting dataflow graph includes at least one node that represents at least one operation represented by the query plan, and includes at least one link that represents at least one dataflow associated with the query plan. In step 1206, the graph generation computer system alters components of the dataflow graph based on a characteristic of the input representing the source of data. The components may be altered to optimize the dataflow graph, for example, to reduce the number of components in the dataflow graph.

The database query managing approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A computer-implemented method of operating on data from at least two data sources, the data stored in respective tangible, non-transitory computer-readable media of the data sources, the operating based on a query that is expressed in accordance with a query language applicable to a relational database, the operating including executing the query on an executing system other than a system managing a relational database, the executing including:
  receiving a query;
  identifying a first data source based on the query;
  identifying a second data source based on the query, the second data source being associated with at least some data processing capability different from at least some data processing capability of the first data source;
  identifying an executing system other than a system managing a relational database;
  generating a request to a query planner based on the query;
  providing the request to the query planner;
  receiving a query plan generated by the query planner based on the request, the query plan including a description of one or more steps for performance by a system managing a relational database;
  generating a computer program that includes at least one data processing operation for execution, the at least one data processing operation including at least one of a data selection operation, a sort operation, a data summarization operation, or a combination operation, wherein the at least one data processing operation is chosen based on a particular step described by the query plan, and the particular step corresponds to the at least one of a data selection operation, a sort operation, a data summarization operation, or a combination operation;

receiving data from the first data source and the second data source; and executing, on the identified executing system, program code based on the computer program.

2. The method of claim 1 in which generating the computer program includes:

generating, based on the query plan, a data structure instantiating a dataflow graph that includes:

a first node that represents at least one operation to be executed, the first node associated with information usable by an executing system to invoke executable program code to perform the operation, the first node associated with information usable by an executing system to make data available to the program code, and the operation being chosen based on a first step described by the query plan, and at least one link that represents output data of an operation of the first node being provided as input data to an operation of a second node of the dataflow graph.

3. The method of claim 2 in which the dataflow graph includes a third node associated with information usable by an executing system to receive the data from the first data source, and a fourth node associated with information usable by an executing system to receive the data from the second data source.

4. The method of claim 3 in which the third node is associated with information usable by an executing system to invoke executable program code that causes a request to perform at least one operation chosen based on a second step described by the query plan to be transmitted to a system managing the first data source.

5. The method of claim 4 including determining that the system managing the first data source is capable of performing the at least one operation chosen based on the second step described by the query plan.

6. The method of claim 4 including determining that a system managing the second data source is not capable of performing the at least one operation chosen based on the second step described by the query plan.

7. The method of claim 2 in which executing the program code based on the dataflow graph includes instantiating a link between a node of the dataflow graph and a node of a second dataflow graph, the second dataflow graph including at least one node that represents an operation to be executed other than an operation chosen based on any step described by the query plan.

8. The method of claim 2 in which the query contains a reference to an executable function, and the dataflow graph includes a node representing the executable function.

9. The method of claim 1 in which the first data source includes a relational database table.

10. The method of claim 9 in which the second data source includes a portion of data other than a relational database table.

11. The method of claim 9 in which the second data source includes a flat file.

12. The method of claim 1 in which the query includes an SQL query.

13. The method of claim 1, including receiving, as output of the program code, results of the query.

14. The method of claim 1 in which the query plan generator includes a query optimizer.

15. The method of claim 1 in which the query plan includes data types of parameters in the query.

16. The method of claim 1 in which the first data source is associated with executable functionality for performing operations on data stored by the first data source and the second data source is not associated with executable functionality for performing operations on data stored by the second data source.

17. The method of claim 1 in which generating a request to a query planner based on the query includes:

producing a structural representation of the first data source wherein the structural representation includes a formatted data organization reflective of the first data source and is absent data of the first data source; and including the structural representation in the request to the query planner.

18. The method of claim 1 in which the computer program is generated by the identified executing system.

19. The method of claim 1 in which the computer program is generated by a system other than the identified executing system.

20. A system, including one or more processors, for operating on data from at least two data sources, the data stored in respective tangible, non-transitory computer-readable media of the data sources, the operating based on a query that is expressed in accordance with a query language applicable to a relational database, the system configured to execute operations for:

receiving a query;

identifying a first data source based on the query;

identifying a second data source based on the query, the second data source being associated with at least some data processing capability different from at least some data processing capability of the first data source;

identifying an executing system other than a system managing a relational database;

generating a request to a query planner based on the query;

providing the request to the query planner;

receiving a query plan generated by the query planner based on the request, the query plan including a description of one or more steps for performance by a system managing a relational database;

generating a computer program that includes at least one data processing operation for execution, the at least one data processing operation including at least one of a data selection operation, a sort operation, a data summarization operation, or a combination operation, wherein the at least one data processing operation is chosen based on a particular step described by the query plan, and the particular step corresponds to the at least one of a data selection operation, a sort operation, a data summarization operation, or a combination operation;

receiving data from the first data source and the second data source; and executing, on the identified executing system, program code based on the computer program.

21. The system of claim 20 in which generating the computer program includes:

generating, based on the query plan, a data structure instantiating a dataflow graph that includes:
a first node that represents at least one operation to be executed,
the first node associated with information usable by an executing system to invoke executable program code to perform the operation,
the first node associated with information usable by an executing system to make data available to the program code, and
the operation being chosen based on a first step described by the query plan, and
at least one link that represents output data of an operation of the first node being provided as input data to an operation of a second node of the dataflow graph.

22. The system of claim 20 in which the first data source includes a relational database table.

23. The system of claim 22 in which the second data source includes a portion of data other than a relational database table.

24. The system of claim 22 in which the second data source includes a flat file.

25. The system of claim 20, the operations including receiving, as output of the program code, results of the query.

26. The system of claim 20 in which the first data source is associated with executable functionality for performing operations on data stored by the first data source and the second data source is not associated with executable functionality for performing operations on data stored by the second data source.

27. A non-transitory computer-readable medium including computer-executable instructions for operating on data from at least two data sources, the data stored in respective tangible, non-transitory computer-readable media of the data sources, the operating based on a query that is expressed in accordance with a query language applicable to a relational database, the operating including executing the query on an executing system other than a system managing a relational database, the executable instructions causing a computer to carry out steps including:
receiving a query;
identifying a first data source based on the query;
identifying a second data source based on the query, the second data source being associated with at least some data processing capability different from at least some data processing capability of the first data source;
identifying an executing system other than a system managing a relational database;
generating a request to a query planner based on the query;
providing the request to the query planner;
receiving a query plan generated by the query planner based on the request, the query plan including a description of one or more steps for performance by a system managing a relational database;
generating a computer program that includes at least one data processing operation for execution, the at least one data processing operation including at least one of a data selection operation, a sort operation, a data summarization operation, or a combination operation, wherein the at least one data processing operation is chosen based on a particular step described by the query plan, and the particular step corresponds to the at least one of a data selection operation, a sort operation, a data summarization operation, or a combination operation;
receiving data from the first data source and the second data source; and
executing, on the identified executing system, program code based on the computer program.

28. The computer-readable medium of claim 27 in which generating the computer program includes:
generating, based on the query plan, a data structure instantiating a dataflow graph that includes:
a first node that represents at least one operation to be executed,
the first node associated with information usable by an executing system to invoke executable program code to perform the operation,
the first node associated with information usable by an executing system to make data available to the program code, and
the operation being chosen based on a first step described by the query plan, and
at least one link that represents output data of an operation of the first node being provided as input data to an operation of a second node of the dataflow graph.

29. The computer-readable medium of claim 27 in which the first data source includes a relational database table.

30. The computer-readable medium of claim 29 in which the second data source includes a portion of data other than a relational database table.

31. The computer-readable medium of claim 29 in which the second data source includes a flat file.

32. The computer-readable medium of claim 27, the operations including receiving, as output of the program code, results of the query.

33. The computer-readable medium of claim 27 in which the first data source is associated with executable functionality for performing operations on data stored by the first data source and the second data source is not associated with executable functionality for performing operations on data stored by the second data source.

34. A system, including one or more processors, for operating on data from at least two data sources, the data stored in respective tangible, non-transitory computer-readable media of the data sources, the operating based on a query that is expressed in accordance with a query language applicable to a relational database, the system including:
means for receiving a query;
means for identifying a first data source based on the query;
means for identifying a second data source based on the query, the second data source being associated with at least some data processing capability different from at least some data processing capability of the first data source;
means for identifying an executing system other than a system managing a relational database;
means for generating a request to a query planner based on the query;
means for providing the request to the query planner;
means for receiving a query plan generated by the query planner based on the request, the query plan including a description of one or more steps for performance by a system managing a relational database;
means for generating a computer program that includes at least one data processing operation for execution, the at least one data processing operation including at least one of a data selection operation, a sort operation, a data summarization operation, or a combination operation, wherein the at least one data processing operation is chosen based on a particular step described by the query plan, and the particular step corresponds to the at least one of a data selection operation, a sort operation, a data summarization operation, or a combination operation;

means for receiving data from the first data source and the second data source; and means for executing, on the identified executing system, program code based on the computer program.

35. The method of claim 1, wherein the computer program includes at least one data processing operation chosen based on some data processing capability of the second data source or some data processing capability of the first data source.

36. The method of claim 1, wherein data processing capability includes executable functionality configured to carry out at least one data processing instruction.

37. The method of claim 1, wherein the combination operation includes a join operation.

38. The method of claim 1, wherein the data summarization operation includes an aggregation operation.

* * * * *